United States Patent
Tsunoda et al.

(10) Patent No.: US 10,706,326 B2
(45) Date of Patent: Jul. 7, 2020

(54) LEARNING APPARATUS, IMAGE IDENTIFICATION APPARATUS, LEARNING METHOD, IMAGE IDENTIFICATION METHOD, AND STORAGE MEDIUM

(71) Applicant: CANON KABUSHIKI KAISHA, Tokyo (JP)

(72) Inventors: Takamasa Tsunoda, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 15/683,103

(22) Filed: Aug. 22, 2017

(65) Prior Publication Data

US 2018/0089537 A1 Mar. 29, 2018

(30) Foreign Application Priority Data

Sep. 26, 2016 (JP) ................................ 2016-187442

(51) Int. Cl.
G06K 9/62 (2006.01)
G06K 9/20 (2006.01)
G06K 9/46 (2006.01)

(52) U.S. Cl.
CPC ........... G06K 9/6256 (2013.01); G06K 9/209 (2013.01); G06K 9/46 (2013.01); G06K 9/628 (2013.01)

(58) Field of Classification Search
None
See application file for complete search history.

(56) References Cited

U.S. PATENT DOCUMENTS

| 2005/0096758 | A1* | 5/2005 | Takezawa | G05B 13/048 700/44 |
| 2010/0138712 | A1* | 6/2010 | Lee | G06F 11/0763 714/746 |
| 2016/0300120 | A1* | 10/2016 | Haas | G06K 9/6206 |
| 2016/0358338 | A1* | 12/2016 | Tsunoda | G06K 9/6267 |
| 2017/0344881 | A1* | 11/2017 | Okuno | G06K 9/6273 |

(Continued)

FOREIGN PATENT DOCUMENTS

JP 5458905 B2 4/2014

OTHER PUBLICATIONS

Tan, Ben, et al. "Multi-transfer: Transfer learning with multiple views and multiple sources." Proceedings of the 2013 SIAM International Conference on Data Mining. Society for Industrial and Applied Mathematics, 2013. (Year: 2013).*

(Continued)

*Primary Examiner* — Andrae S Allison
(74) *Attorney, Agent, or Firm* — Canon U.S.A., Inc. I.P. Division

(57) ABSTRACT

A learning apparatus includes an acquisition unit, a creation unit, and a first learning unit. The acquisition unit acquires a plurality of leaning data sets including a plurality of images imaged by a plurality of imaging devices, and sensor information of the imaging devices when the plurality of respective images is imaged. The creation unit creates, from the plurality of the plurality of learning data sets, a plurality of subsets, wherein each of the plurality of subsets has a different combination of the plurality of images and the sensor information. The first learning unit learns a plurality of first classifiers respectively corresponding to the plurality of subsets based on the plurality of respective subsets.

10 Claims, 18 Drawing Sheets

(56) References Cited

U.S. PATENT DOCUMENTS

| | | | | |
|---|---|---|---|---|
| 2018/0068083 A1* | 3/2018 | Cohen | ................... | G16H 50/30 |
| 2018/0373766 A1* | 12/2018 | Crabtree | ............. | H04L 63/0421 |
| 2019/0005356 A1* | 1/2019 | Tsunoda | ............... | G06K 9/6262 |

OTHER PUBLICATIONS

Pan, Sinno Jialin, and Qiang Yang. "A survey on transfer learning." IEEE Transactions on knowledge and data engineering 22.10 (2009): 1345-1359. (Year: 2009).*

Yao, Yi, and Gianfranco Doretto. "Boosting for transfer learning with multiple sources." 2010 IEEE Computer Society Conference on Computer Vision and Pattern Recognition. IEEE, 2010. (Year: 2010).*

Xu Z., Sun S. (2012) Multi-source Transfer Learning with Multi-view Adaboost. In: Huang T., Zeng Z., Li C., Leung C.S. (eds) Neural Information Processing. ICONIP 2012. Lecture Notes in Computer Science, vol. 7665. Springer, Berlin, Heidelberg (Year: 2012).*

Z. Xu and S. Sun, "Multi-view Transfer Learning with Adaboost," 2011 IEEE 23rd International Conference on Tools with Artificial Intelligence, Boca Raton, FL, 2011, pp. 399-402. (Year: 2011).*

Zhuang, Fuzhen, et al. "Supervised representation learning: Transfer learning with deep autoencoders." Twenty-Fourth International Joint Conference on Artificial Intelligence. 2015. (Year: 2015).*

Zhuang et al, Transfer Learning with Multiple Sources via Consensus Regularized Autoencoders, ECML PKDD 2014, Part III, LNCS 8726, pp. 417-431, 2014. (Year: 2014).*

Tan, Ben, et al. "Multi-transfer: Transfer learning with multiple views and multiple sources." Proceedings of the 2013 SIAM International Conference on Data Mining. Society for Industrial and Applied Mathematics, 2013. (Year: 2013).* van Kasteren, Tim, Gwenn Englebienne, and Ben JA Kröse. "Recognizing Activities in Multiple Contexts using Transfer Learning." AAAI Fall Symposium: AI in Eldercare: New Solutions to Old Problems. 2008. (Year: 2008).*

Ben Tan et al. Multi-Transfer: Transfer Learning with Multiple Views and Multiple Sources. Apr. 28, 2014. pp. 282-293. vol. 7, Issue 4. Statistical Analysis and Data Mining: The ASA Data Science Journal.

Radhakrishna Achanta et al. SLIC Superpixels. Jun. 2010. EPFL Technical Report 149300.

Gabriella Csurka et al. Visual Categorization with Bags of Keypoints. 2004. CCV International Workshop on Statistical Learning in Computer Vision, Prague.

Svetlana Lazebnik et al. Beyond Bags of Features: Spatial Pyramid Matching for Recognizing Natural Scene Categories. Jun. 2006. pp. 2169-2178. vol. 2. 2006 IEEE Computer Society Conference on Computer Vision and Pattern Recognition.

Aude Oliva et al. Modeling the Shape of the Scene: A Holistic Representation of the Spatial Envelope. May 2001, vol. 42, Issue 3, pp. 145-175. International Journal of Computer Vision. Kluwer Academic Publishers, Dordrecht, the Netherlands.

* cited by examiner

|          | IMAGE DB | CAMERA A | CAMERA B | CAMERA C |
|----------|----------|----------|----------|----------|
| IMAGE    | ○        | ○        | ○        | ○        |
| SENSOR a |          | ○        | ○        | ○        |
| SENSOR b |          |          | ○        |          |
| SENSOR c |          |          |          | ○        |

FIG. 9A
FIG. 9B
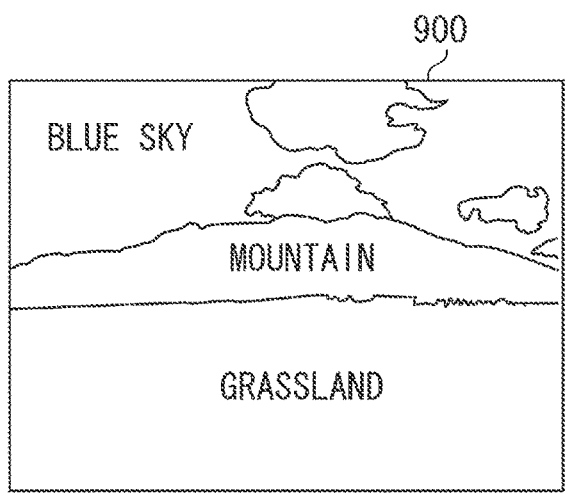
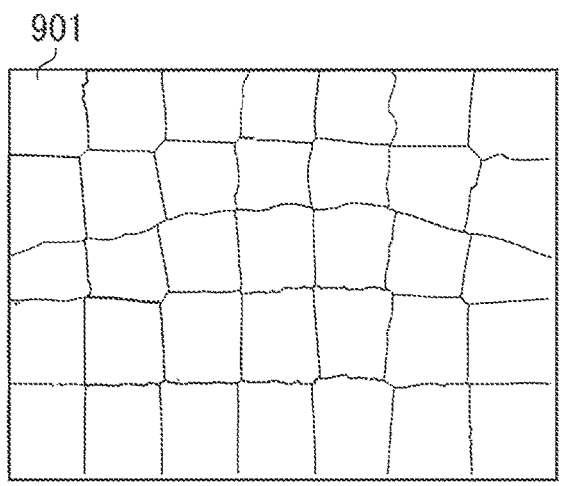

FIG. 14
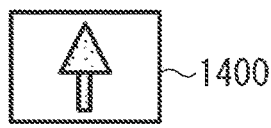
1400
SUBSET S₁
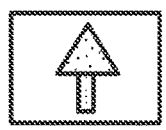 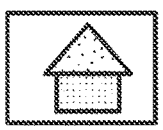 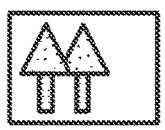 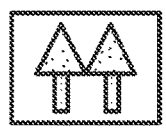 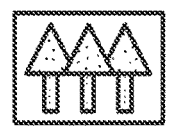
IMAGE 1    IMAGE 2    IMAGE 3    IMAGE 4    IMAGE 5
SIMILARITY:0.8   SIMILARITY:0.7   SIMILARITY:0.65   SIMILARITY:0.6   SIMILARITY:0.59
SUBSET S₂
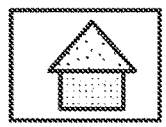 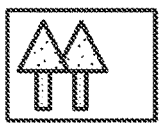 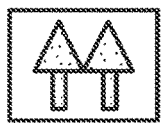 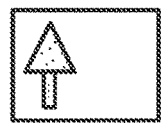 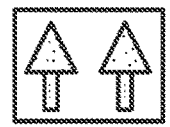
IMAGE 2    IMAGE 3    IMAGE 4    IMAGE 6    IMAGE 7
SIMILARITY:0.7   SIMILARITY:0.65   SIMILARITY:0.6   SIMILARITY:0.55   SIMILARITY:0.52
SUBSET S₃
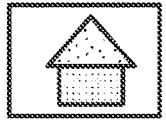 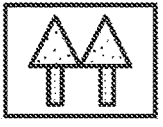 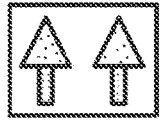 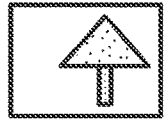 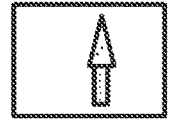
IMAGE 2    IMAGE 4    IMAGE 7    IMAGE 8    IMAGE 9
SIMILARITY:0.7   SIMILARITY:0.6   SIMILARITY:0.52   SIMILARITY:0.5   SIMILARITY:0.48

LEARNING APPARATUS, IMAGE IDENTIFICATION APPARATUS, LEARNING METHOD, IMAGE IDENTIFICATION METHOD, AND STORAGE MEDIUM

BACKGROUND OF THE INVENTION

Field of the Invention

The present disclosure relates to a technology concerning image identification using images and detection results of sensors.

Description of the Related Art

Conventionally, techniques using not only images but also detection results of sensors are known in image identification technologies for identifying an object from an image. Japanese Patent No. 5458905 discusses a technique for correcting a luminance level of each pixel, with a photometric value acquired using parameters (e.g., exposure time, sensitivity (ISO), and numerical aperture (F value)) at image capturing, and determining whether the scene is an indoor scene or an outdoor scene and identifying a shadow region in the case of the outdoor scene, using classifiers. Further, non-patent literature 1 (B. Tan, E. Zhong, E. Wei Xiang, Q. Yang, "Multi-Transfer: Transfer Learning with Multiple Views and Multiple Sources", Statistical analysis and Data Mining, 2013) discusses a transfer learning technique for estimating defect sensor data in a non-uniform data set that includes defect data although including a plurality of pieces of sensor information.

However, sensor information common to all the images that serve as learning data may not exist. The non-patent literature 1 discusses a technique for estimating another sensor information from one piece of sensor information. However, if there is no correlation between the pieces of sensor information, estimation of the sensor information is difficult.

SUMMARY OF THE INVENTION

The present disclosure has been made in view of such issues, and is directed to a learning apparatus for identifying an image accurately based on sensor information and images.

According to an aspect of the present invention, a learning apparatus includes an acquisition unit configured to acquire a plurality of leaning data sets including a plurality of images imaged by a plurality of imaging devices, and sensor information of the imaging devices when the plurality of respective images are imaged, a creation unit configured to create, from the plurality of the plurality of learning data sets, a plurality of subsets, wherein each of the plurality of subsets has a different combination of the plurality of images and the sensor information, and a first learning unit configured to learn a plurality of first classifiers respectively corresponding to the plurality of subsets based on the plurality of respective subsets.

Further features of the present invention will become apparent from the following description of embodiments with reference to the attached drawings.

BRIEF DESCRIPTION OF THE DRAWINGS

FIGS. 9A and 9B are explanatory diagrams of division processing.

FIG. 14 is an explanatory diagram of a cumulative similarity calculation processing.

DESCRIPTION OF EMBODIMENTS

Hereinafter, embodiments will be described with reference to the drawings.

Figure 1:
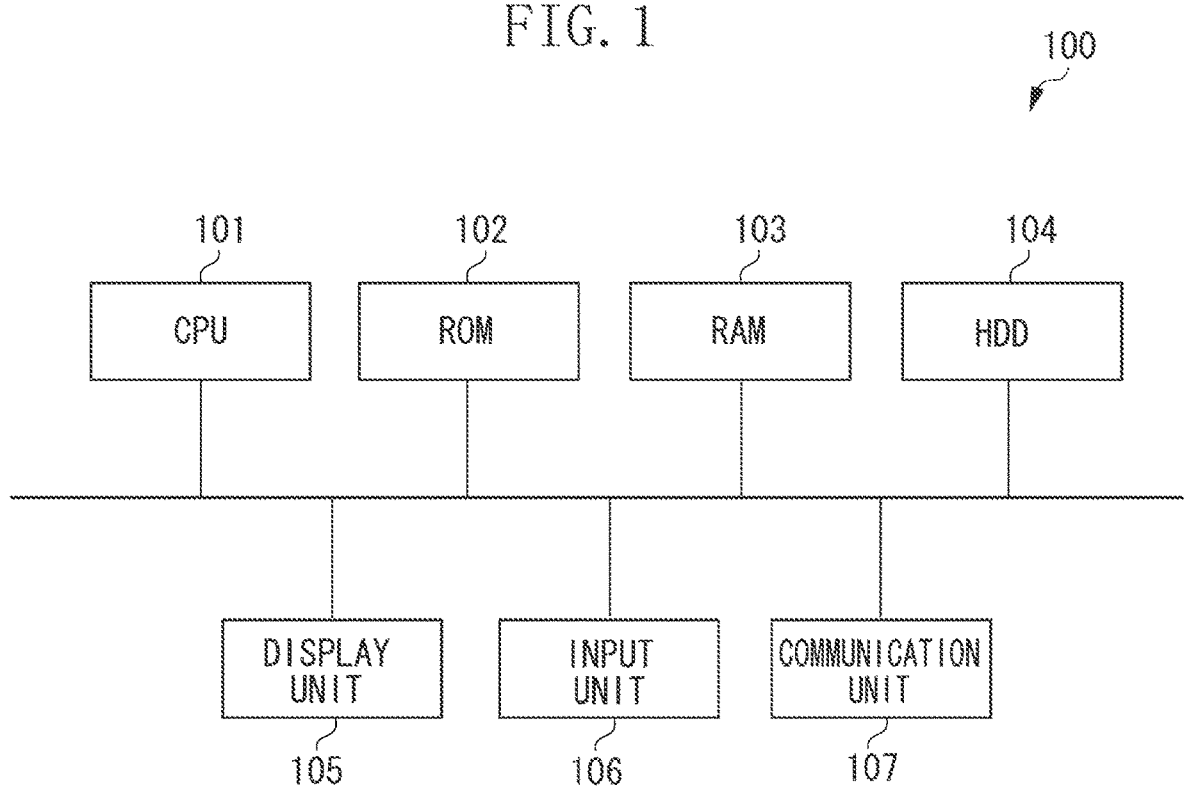
FIG. 1 is a block diagram illustrating a hardware configuration of an image identification apparatus.

FIG. 1 is a block diagram illustrating a hardware configuration of a learning apparatus 100 according to a first embodiment. The learning apparatus 100 includes a central processing unit (CPU) 101, a read only memory (ROM) 102, a random access memory (RAM) 103, a hard disk drive (HDD) 104, a display unit 105, an input unit 106, and a communication unit 107. The CPU 101 reads a control program stored in the ROM 102 and executes various types of processing. The RAM 103 is used as a temporary storage area such as a main memory and a work area of the CPU 101. The HDD 104 stores various data and programs. Functions and processing of the learning apparatus 100 described below are realized by the CPU 101 reading the programs stored in the ROM 102 or the HDD 104 and executing the programs.

The display unit 105 displays various types of information. The input unit 106 includes a keyboard and a mouse, and receives various operations by a user. The communication unit 107 performs communication processing with an external device through a network. An example of the network includes Ethernet®. Further, as another example, the communication unit 107 may perform wireless communication with an external device.

Figure 2:
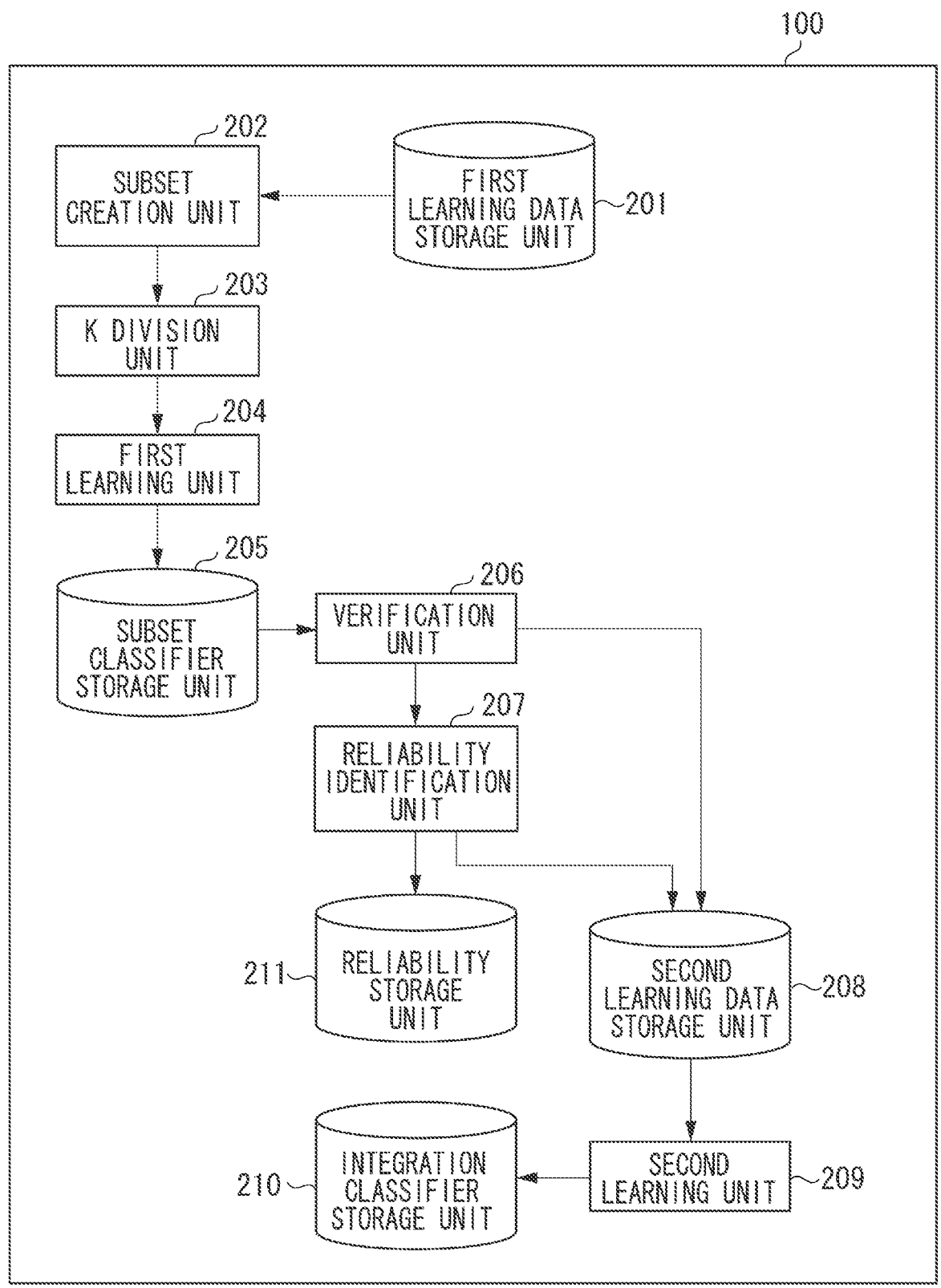
FIG. 2 is a block diagram illustrating a functional configuration of a learning apparatus.

FIG. 2 is a block diagram illustrating a functional configuration of the learning apparatus 100. The learning apparatus 100 learns a classifier used for image identification performed based on an image and at least one type of sensor information. Here, the sensor information is information that indicates a detection result obtained by a sensor. The sensor corresponding to the sensor information may be integrally provided with an imaging device that images a corresponding image or may be provided as a separate device. Further, the sensor information is obtained at a timing corresponding to an imaging timing of the image and is associated with the image. Here, the corresponding timing is a timing at which the image and the sensor information have a relationship, such as a timing that is the same timing as the imaging timing, or a timing within a predetermined period before and after the imaging timing.

The learning apparatus 100 includes a first learning data storage unit 201, a subset creation unit 202, a K division unit 203, a first learning unit 204, and a subset classifier storage unit 205. The learning apparatus 100 further includes a verification unit 206, a reliability identification unit 207, a second learning data storage unit 208, a second learning unit 209, an integration classifier storage unit 210, and a reliability storage unit 211. The first learning data storage unit 201 stores a learning data set used for learning classifiers used for image identification. In the present embodiment, the learning data set includes set data of the images and the sensor information, in addition to a data set of the images alone.

Figure 3A:
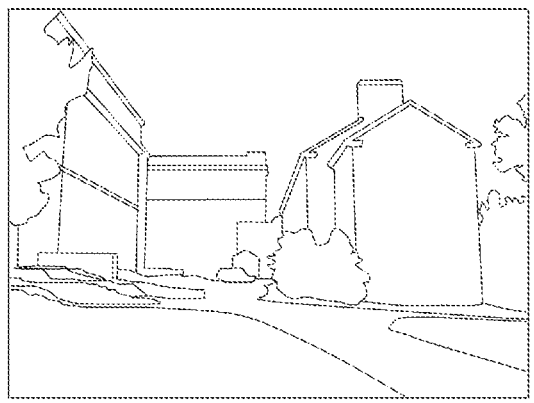
FIGS. 3A and 3B are explanatory diagrams of an image included in a learning data set.
Figure 3B:
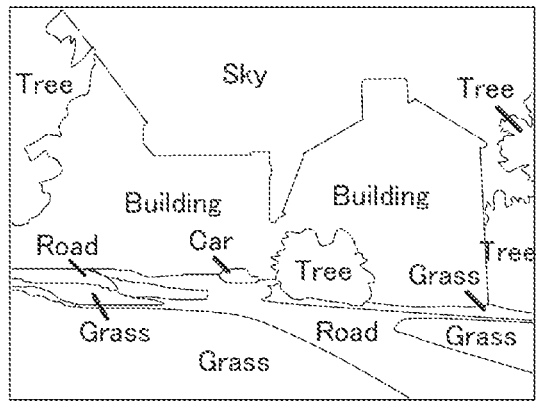

FIGS. 3A and 3B are explanatory diagrams included in the learning data set. Region categories such as Sky and Building are defined in units of pixels as illustrated in FIG. 3B, for an image 300 illustrated in FIG. 3A. The region categories are defined by an administrator or the like in advance. A map to which the region categories of correct answers are allocated, like FIG. 3B, is called ground truth (GT).

Figure 4:
FIG. 4 is a table schematically illustrating a learning data set.

FIG. 4 is a table schematically illustrating a learning data set. The learning apparatus 100 according to the present embodiment learns classifiers for performing image identification, using a data set obtained from a camera B illustrated in FIG. 4 as an input. A sensor a and a sensor b are mounted on the camera B, and a captured image obtained by the camera B is associated with sensor information a obtained from the sensor a at the time of imaging and sensor information b obtained from the sensor b at the time of imaging. Thus, a target data set includes the captured image obtained by the camera B, the sensor information a, and the sensor information b.

A data set that includes the image included in the target data set and at least one piece of the sensor information included in the target data set are set to the target data set as the learning data set. In the present embodiment, the learning data set is stored in the learning apparatus 100 in advance. As another example, the learning apparatus 100 may acquire the learning data set from an external device before the start of learning processing described below.

In the present embodiment, as illustrated in FIG. 4, the learning data set includes a data set including a plurality of images obtained from an image database (DB). Further, the learning data set includes a data set including a plurality of images obtained by the camera A, and pieces of the sensor information a respectively corresponding to the images. Here, the sensor information a is a detection result obtained at the time of capturing the corresponding image by the sensor a included in the camera A.

The learning data set further includes a data set including a plurality of images obtained by the camera B, and the pieces of sensor information a and the pieces of sensor information b respectively corresponding to the images. Here, the sensor information a is a detection result obtained at the time of capturing the corresponding image by the sensor a included in the camera B. Further, the sensor information b is a detection result obtained at the time of capturing the corresponding image by the sensor b included in the camera B.

The learning data set further includes a data set including a plurality of images obtained by the camera C, and the pieces of sensor information a and pieces of sensor information c respectively corresponding to the images. Here, the sensor information a is a detection result obtained at the time of capturing the corresponding image by the sensor a included in the camera C. Further, the sensor information c is a detection result obtained at the time of capturing the corresponding image by the sensor c included in the camera C.

Note that the type of the sensor information stored together with the images is not especially limited. The sensor information may be information associated with imaging/developing processing by a camera, such as a luminance value acquired at exposure control by a camera, distance information of at autofocus (AF) control, or a RAW image to which gamma correction, compression of a tonal number, and the like are not applied. As another example, the sensor information may be information obtained by an additional sensor or device having no direct relationship with the imaging/developing. Specifically, examples of the sensor information include information indicating detection results by a gyro sensor, a magnetic field sensor (compass), and pressure/humidity/temperature sensors. Further, the sensor information may be a parallax map or a depth map by a multi-view camera, position information by the global positioning system (GPS), a time, or the like.

Referring back to FIG. 2, the subset creation unit 202 creates a plurality of subsets from the learning data stored in the first learning data storage unit 201. The K division unit 203 divides data of the subsets into learning data and verification data. In the present embodiment, the K division unit 203 performs k-division cross verification and thus divides the data in the subset into K data. Then, the learning apparatus 100 performs learning and verification K times.

The first learning unit 204 learns classifiers for respective subsets. Hereinafter, the classifiers for respective subsets are referred to as subset classifiers. For example, in a case where the number of subsets is three, the first learning unit 204 learns three subset classifiers. The first learning unit 204 stores the obtained subset classifiers to the subset classifier storage unit 205.

The verification unit 206 evaluates accuracy (generalization accuracy) for the verification data, of the subset classifiers obtained through learning by the K division unit 203, and stores the generalization accuracy to the second learning data storage unit 208. The reliability identification unit 207 determines reliabilities of the subset classifiers based on the generalization accuracy, and stores the reliabilities to the second learning data storage unit 208 and the reliability storage unit 211. At this time, the reliability identification unit 207 stores, to the second learning data storage unit 208, a classification result for the verification data by the subset classifier, and a region category GT of a corresponding small region.

The second learning unit 209 learns an integration classifier that integrates the classification results by the subset classifiers, using the classification results of the subset classifiers evaluated K times by the k-division cross verification method, the reliabilities, and the region categories GT. The second learning unit 209 stores the obtained integration classifier into the integration classifier storage unit 210.

Figure 5:
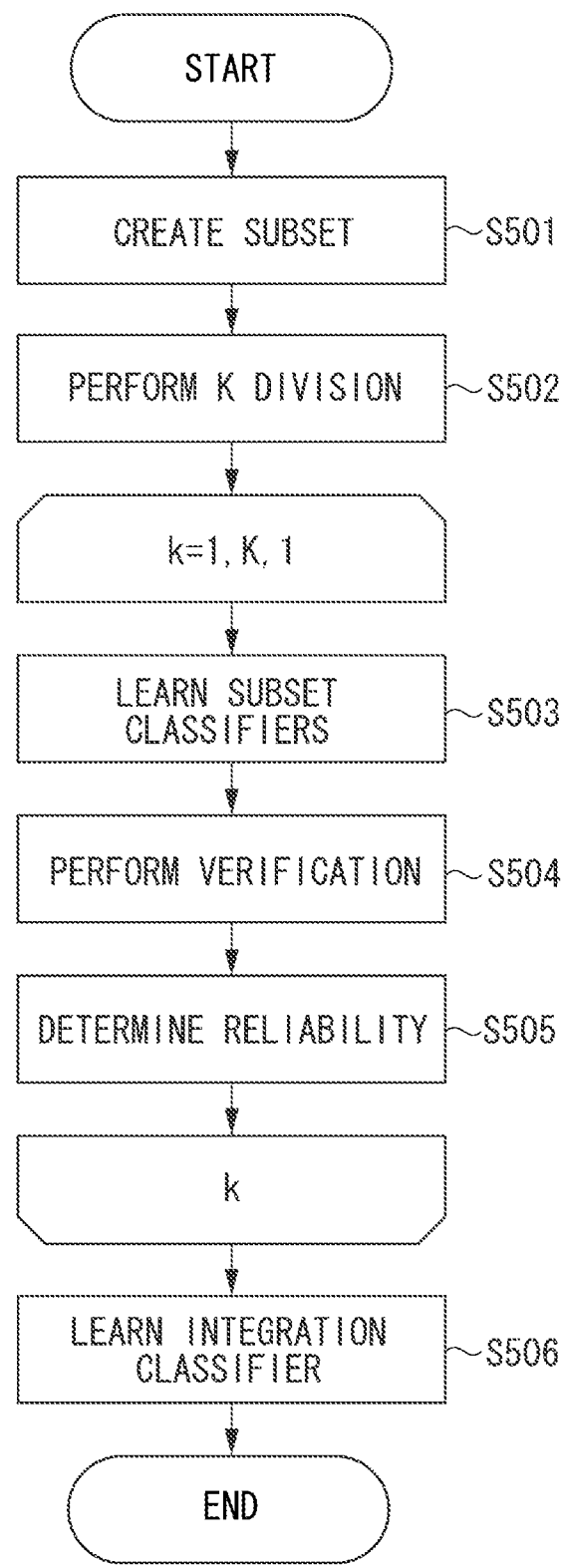
FIG. 5 is a flowchart illustrating learning processing.

FIG. 5 is a flowchart illustrating learning processing performed by the learning apparatus 100. In the present embodiment, a case of using the learning data set illustrated in FIG. 4 will be described as an example. Further, in the present embodiment, the k-division cross verification method is used for leaning classifiers. In step S501, the subset creation unit 202 acquires the learning data set from the first learning data storage unit 201, and creates a plurality of subsets based on the learning data set. Each of the subsets created at that time includes an image. Further, the subset creation unit 202 creates a plurality of subsets, in which combinations of the image and the sensor information included in the subsets are different from each other.

For example, in the learning data set described with reference to FIG. 4, the target data set includes the information b. Therefore, the subset creation unit 202 selects data sets including at least the images, and having different combinations of the sensor information a and the sensor information b, as subsets. With this operation, the subset creation unit 202 can create a subset of only the images, a subset of the image and the sensor information a, a subset of the image and the sensor information b, and a subset of the images, the sensor information a, and the sensor information b. However, it is not necessary to create the subsets corresponding to all the combinations that can be obtained from the sensor information of the target data set, and it is only necessary to create one or more subsets. For example, it is favorable to select an appropriate number of data sets in the perspective of adjustment of the number of data and learning efficiency. When the target data set includes data not effective for a task in the image identification, the data may be eliminated from the subset.

Figure 6:
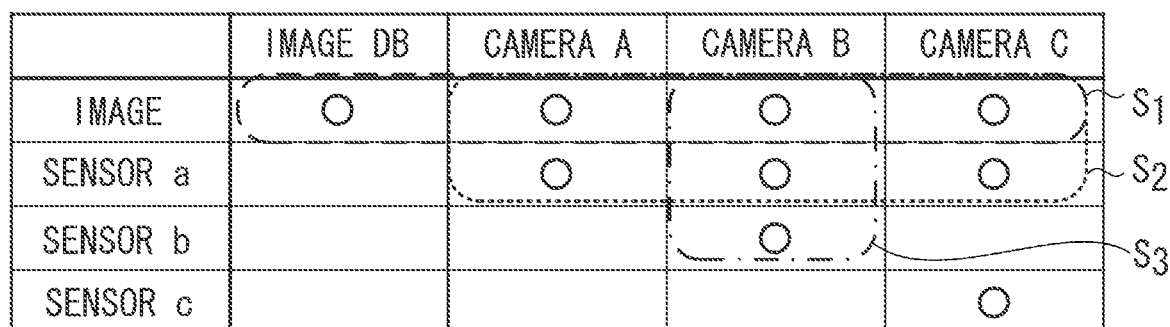
FIG. 6 is a table illustrating subsets.

In the present embodiment, as illustrated in FIG. 6, description will be continued on the assumption that the subset creation unit 202 creates a subset $S_1$ consisting of only the images, a subset $S_2$ consisting of the images and the sensor information a, and a subset $S_3$ consisting of the image, the sensor information a and the sensor information b, from among the above-described subsets.

After the processing in step S501, in step S502, the K division unit 203 divides the data included in the subsets created in step S501 into K data. This is because the k-division cross verification method is used for learning classifiers. To be more specific, the K division unit 203 randomly allocates 1 to K integer labels to the images. In the k-th step in repeat processing described below, data with a label k is used as the verification data, and data with labels other than k are used as the learning data.

The present processing is an embodiment of performing cross verification, using an image as one unit. As another example, a method of dividing an image into small regions, allocating 1 to K labels to the small regions, and performing K division may be used. As still another example, a method of using a series of images as one unit, the images having been captured by changing some parameters such as exposure and aperture at the time of image-capturing and not changing the composition and a subject, may be used. In other words, a method of allocating 1 to K labels to the series of image group and performing K division may be used. When such an image group where only the parameters at image-capturing are changed exists in the learning data set, the method of K dividing the series of image group is effective.

The CPU 101 repeats three processes (steps S503 to S505) subsequent to step S502 K times by application of the k-division cross verification method. In the 1 to K steps, the CPU 101 uses the learning data and the verification data set in the K division processing (step S502), with respect to the subsets.

In step S503, the first learning unit 204 learns subset classifiers, using the learning data of the subsets. The first learning unit 204 first divides the image in the subset into small regions, and extracts image feature amounts from the small regions of the image. Further, when the sensor information is included in the subset, the first learning unit 204 extracts sensor information feature amounts corresponding to the small regions from the sensor information. Then, the first learning unit 204 learns the subset classifiers based on the image feature amounts and the sensor information feature amounts, using the region categories GT corresponding to the small regions as teacher values. The image feature amount is a feature amount extracted from the image. The sensor information feature amount is a feature amount extracted from the sensor information.

Further, the small region is a region configured of a plurality of pixels in which red-green-blue (RGB) values and positions are similar. In the present embodiment, the first learning unit 204 divides the image into small regions called super-pixels (SPs) described in the following non-patent literature.
R. Achanta, A. Shaji, K. Smith, A. Lucchi, "SLIC Superpixels", EPFL Technical Report, 2010.
The small region is not limited to that of the present embodiment, and the first learning unit 204 may use grid-like small regions each divided into a square shape.

Further, examples of the image feature amounts acquired from the respective small regions include RGB statistics, RGB histogram, and a local binary pattern (LBP). Further, an example of the sensor information feature amount includes a luminance value. The luminance value can be converted for each pixel, and thus a value of each small region can be easily obtained by averaging values of pixels. Further, examples of the sensor information feature amount include detection results of a gyro sensor, and a GPS, where one value is provided to one image. In these values, one value can be obtained for one image. When one value corresponds to one image in this way, the same value may just be provided to all the sensor information feature amounts for the small regions. Further, as for data (e.g., a distance map) acquired with resolution different from spatial resolution of an image, the value of the small region can be provided by performing preprocessing such as averaging values within the small region, sampling a representative point, or performing interpolation.

The subset $S_1$ is configured of only the images. Therefore, as for the subset $S_1$, the first learning unit 204 divides the image within the subset $S_1$ into small regions, and extracts the image feature amounts from the small regions of the image. Then, the first learning unit 204 learns a subset classifier $C_1$ corresponding to the subset $S_1$ based on the image feature amounts, using, as teacher values, region categories GT corresponding to the small regions.

Further, as for the subset $S_2$ or $S_3$, the first learning unit 204 extracts the sensor information feature amounts corresponding to the small regions from the sensor information, in addition to extraction of the image feature amounts. Then, the first learning unit 204 learns a subset classifier $C_2$ corresponding to the subset $S_2$ based on the teacher values, the image feature amounts of the subset $S_2$, and the sensor information feature amounts. Further, the first learning unit 204 learns a subset classifier $C_3$ corresponding to the subset $S_3$ based on the teacher values, the image feature amounts of the subset $S_3$, and the sensor information feature amount. In this way, when there are three subsets, the first learning unit 204 obtains the three subset classifiers $C_1$, $C_2$, and $C_3$ respectively corresponding to the three subsets. The first learning unit 204 stores the obtained subset classifiers to the subset classifier storage unit 205.

The subset classifier is not limited to that of the embodiment as long as the subset classifier is a classifier that performs multi-class classification. Other examples of the subset classifier include random forest and neural network in addition to multi-classed logistic regression and support vector machine.

Next, in step S504, the verification unit 206 performs verification of the subset classifiers obtained in step S503, using the verification data of the subsets obtained in step S502 to obtain a classification result for the verification data. The verification unit 206 further obtains generalization accuracy from the classification result. Then, similar to the processing in step S503, the verification unit 206 stores the classification result for the verification data, and the region categories GT of the corresponding small regions into the second learning data storage unit 208. To be more specific, the verification unit 206 divides the image in the subset into small regions, extracts the image features from the small regions of the image, and extracts the sensor information feature amounts corresponding to the small regions from the sensor information when the sensor information is included. Then, the verification unit 206 classifies the region categories of the small regions, using the subset classifiers corresponding to the subsets stored in the subset classifier storage unit 205. The verification unit 206 obtains the generalization accuracy of each subset classifier, from the classification results by the subset classifiers and the region categories GT corresponding to the small regions. The generalization accuracy is a correct answer rate of each subset classifier for the verification data.

The verification unit 206 may use experience accuracy as accuracy for the learning data, from the classification result, in place of the generalization accuracy. In this case, the verification unit 206 performs classification for the learning data in step S504, and acquires the experience accuracy.

Next, in step S505, the reliability identification unit 207 determines the reliabilities of the subset classifiers based on the generalization accuracy determined in step S504. Then, the reliability identification unit 207 stores the reliabilities into the second learning data storage unit 208 and the reliability storage unit 211. In the present embodiment, the reliability identification unit 207 calculates reliability At by the formula (1). In the formula (1), $R_t$ is the generalization accuracy, T is the number of subsets, the subscript i represents an ID (t=1, 2, . . . , T) of the subset.

$$A_t = \frac{TR_t}{\sum_{t}^{T} R_t} \quad (1)$$

In the present embodiment, accuracy of the region discriminator is acquired only from a generalization error. However, it is not limited thereto. As described above, the experience accuracy may be used together, or the reliability may be obtained from the number of learning data, the number of dimensions of a feature amount, or the number of support vectors in the support vector machine.

By application of the k-division cross verification method, the processing of steps S503 to S505 is performed K times, and the region categories GT for the verification data, the classification results, and the reliabilities are stored into the second learning data storage unit 208. In addition, the classification result may be binary data instructing the region category. However, the classification result may be a continuous value representing a likelihood of each region category, such as a probability value converted with a margin from the support vector in the support vector machine or an output of logistic regression. In addition, the verification data themselves of the subset classifiers are stored in the second learning data storage unit 208, and the verification data may be used in learning of the integration classifier in the latter step.

After the processing of steps S503 to S505 is performed K times, the CPU 101 advances the processing to step S506. In step S506, the second learning unit 209 learns the integration classifier. The integration classifier integrates the classification results by the subset classifiers, and outputs a conclusive classification result. The region categories GT corresponding to the small regions are used as the learning teacher values, and the classification results and the reliabilities of the subset classifiers are used as the feature amounts, as described above. As another example, the image feature amount or the sensor information feature amount used in learning the subset classifier may be used as the feature amount.

When evaluation is made K times by the k-division cross verification method, like the present embodiment, the reliability of the subset classifier often takes different values in K times, respectively. When each of the subsets is only divided into two data of the learning data and the verification data, and the learning and the verification are performed once, the reliability is always constant and cannot be the feature amount. In this case, the second learning unit 209 may multiply the likelihood of the continuous value of the subset classifier by the reliability and employ the product as the feature amount.

As described above, the learning apparatus 100 creates the plurality of subsets, each of the subsets having a different combination of the images and the sensor information, for the images and the sensor information included in the target data set of image identification. Then, the learning apparatus 100 learns the plurality of subset classifiers corresponding to the subsets, and the integration classifier that integrates the classification results of the subset classifiers. In this way, the learning apparatus 100 according to the present embodiment can efficiently use the data of the learning data set and can learn the classifiers.

Figure 7:
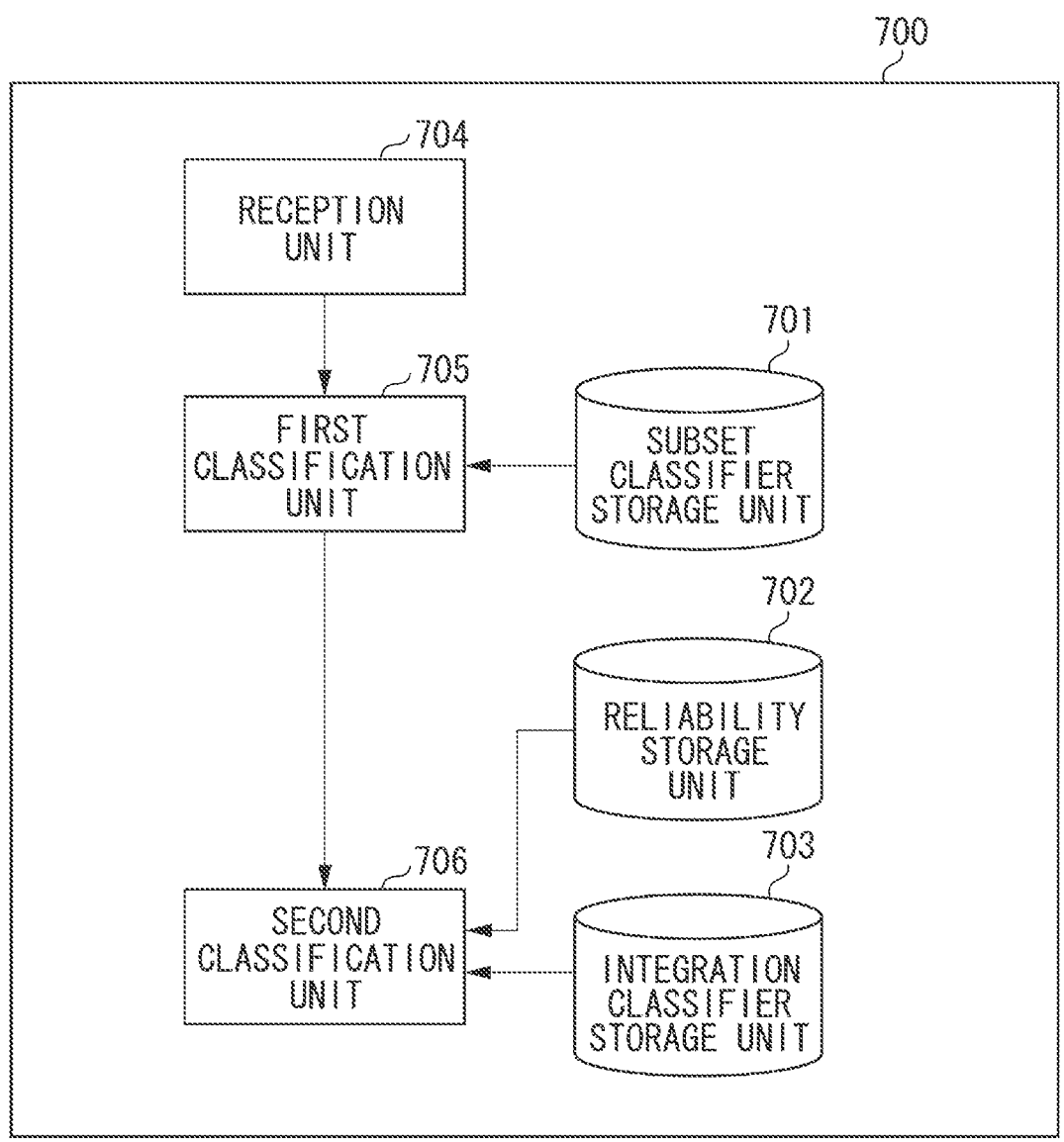
FIG. 7 is a block diagram illustrating a functional configuration of an image identification apparatus according to a second embodiment.

Next, an image identification apparatus that performs image identification, using the classifiers obtained by the learning apparatus 100 will be described. The image identification apparatus according to the present embodiment performs image identification and performs semantic region division. The image identification apparatus outputs the region category as illustrated in FIG. 3B to the image illustrated in FIG. 3A in units of pixels, for example. FIG. 7 is a block diagram illustrating a functional configuration of an image identification apparatus 700. The image identification apparatus 700 includes a subset classifier storage unit 701, a reliability storage unit 702, an integration classifier storage unit 703, a reception unit 704, a first classification unit 705, and a second classification unit 706.

The subset classifiers, the reliabilities of the subset classifiers, and the integration classifier, which are obtained by the learning apparatus 100, are stored in the subset classifier storage unit 701, the reliability storage unit 702, and the integration classifier storage unit 703 in advance. In a case where the k-division cross verification method is applied at the time of learning, K different reliabilities are usually obtained for each of the plurality of subset classifiers. An average value or a median of the K different reliabilities is stored in the reliability storage unit 702 as the reliability of the subset classifier. In addition, the reliability of the subset classifier is not limited thereto as long as the reliability is determined from a plurality of reliabilities obtained for the subset classifier.

The reception unit 704 receives the target data set including a target image that becomes a target of image identification. The target data set may be input from an external device or may be read from the HDD 104 of the image identification apparatus 700 or the like. In the example illustrated in FIG. 4, the reception unit 704 receives the target data set from the camera B. The first classification unit 705 obtains the respective classification results of the plurality of subset classifiers, from corresponding feature amounts of the target data set, using the plurality of subset classifiers stored in the subset classifier storage unit 701. The second classification unit 706 integrates the classifiers of the subset classifiers based on the classification results in the first classification unit 705 and the reliabilities stored in the reliability storage unit 702, using the integration classifier stored in the integration classifier storage unit 703 to obtain the conclusive classification result of the region categories. The hardware configuration of the image identification apparatus 700 is similar to that of the learning apparatus 100 described with reference to FIG. 1.

Figure 8:
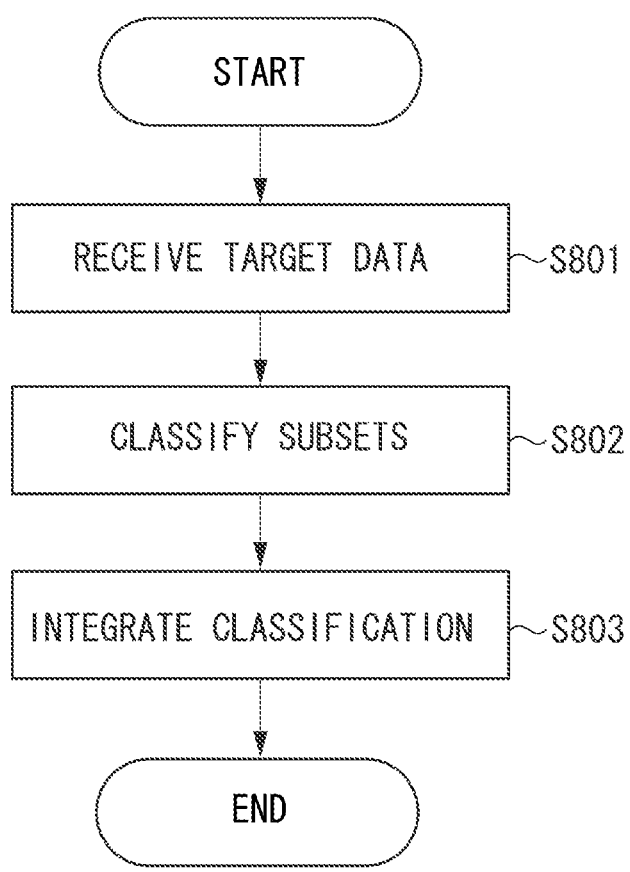
FIG. 8 is a flowchart illustrating image identification processing according to the second embodiment.

FIG. 8 is a flowchart illustrating image identification processing performed by the image identification apparatus 700. In step S801, the reception unit 704 receives the target data set (reception processing). In the present embodiment, the reception unit 704 receives one frame of image and the sensor information corresponding to the image. When the image serving as the target of the image identification processing is a moving image, the reception unit 704 may receive the moving image and time-series sensor information corresponding to frames of the moving image. In this case, in step S802 and the subsequent processing, it is only necessary that the image identification processing is performed in units of frames, using an image of one frame and the sensor information corresponding to the image, as the processing target.

Next, in step S802, the first classification unit 705 obtains classification results for the target data set, using the plurality of subset classifiers stored in the subset classifier storage unit 701. For example, the first classification unit 705 divides a target image 900 illustrated in FIG. 9A into small regions 901 illustrated in FIG. 9B. Then, the first classification unit 705 classifies the region category in units of small regions, based on the image feature amount and the sensor information feature amount corresponding to the subset. In the present embodiment, the first classification unit 705 inputs the image feature amount of the target image included in the target data set to the subset classifier $C_1$ so as to obtain the classification result. Further, the first classification unit 705 inputs the image feature amount of the image included in the target data set and the sensor information feature amount of the sensor information a to the subset classifier $C_2$ so as to obtain the classification result. Further, the first classification unit 705 inputs the image feature amount of the image included in the target data set, the sensor information feature amount of the sensor information a, and the sensor information feature amount of the sensor information b to the subset classifier $C_3$ so as to obtain the classification result.

In addition, whether the classification result is obtained as a binary value that instructs the region category or the likelihood of each region category is set in advance according to the integration classifier. In the present embodiment, the likelihood of each region category is employed. In a case where the number of the region categories is four, likelihoods of each category $L_1$, $L_2$, and $L_3$ of the region discriminators $C_1$, $C_2$, and $C_3$ are obtained by the formula (2):

$$L_1=\{l_1^{(1)},l_1^{(2)},l_1^{(3)},l_1^{(4)}\}, L_2=\{l_2^{(1)},l_2^{(2)},l_2^{(3)},l_2^{(4)}\},\\ L_3=\{l_3^{(1)},l_3^{(2)},l_3^{(3)},l_3^{(4)}\} \quad (2)$$

where $l_t^{(i)}$ represents the likelihood of an i-th category of a t-th subset classifier, the subscript t represents an ID of the subset, and i represents an ID of the category.

Next, in step S803, the second classification unit 706 integrates the classification results of the subset classifiers, based on the classification results stored by the first classification unit 705 and the reliabilities stored in the reliability storage unit 702, using the integration classifier stored in the integration classifier storage unit 703. With the integration, a conclusive classification result of the region categories for the small regions is obtained.

When the reliabilities of the subset classifiers $C_1$, $C_2$, and $C_3$ are $A_1$, $A_2$, and $A_3$, respectively, a feature amount f input to the integration classifier is expressed by the formula (3):

$$f=\{L_1,A_1,L_2,A_2,L_3,A_3\} \quad (3)$$

The feature amount input to the integration classifier may be the image feature amounts or the sensor information feature amounts used as inputs of the subset classifiers, in addition to the classification results and the reliabilities of the subset classifiers. In this case, the learning apparatus 100 learns the integration classifier according thereto, and the integration classifier storage unit 210 stores the integration classifier according thereto in advance.

As described above, the image identification apparatus 700 according to the first embodiment performs image identification by a plurality of subset classifiers respectively corresponding to a plurality of subsets, each of the subsets having a different combination of images and sensor information included in a target data set, and an integration classifier. With the classification, an image can be identified with high accuracy based on the sensor information and the images.

In the present embodiment, the learning apparatus 100 and the image identification apparatus 700 have been described as independent apparatus. However, the apparatus may be integrally provided.

Figure 10:
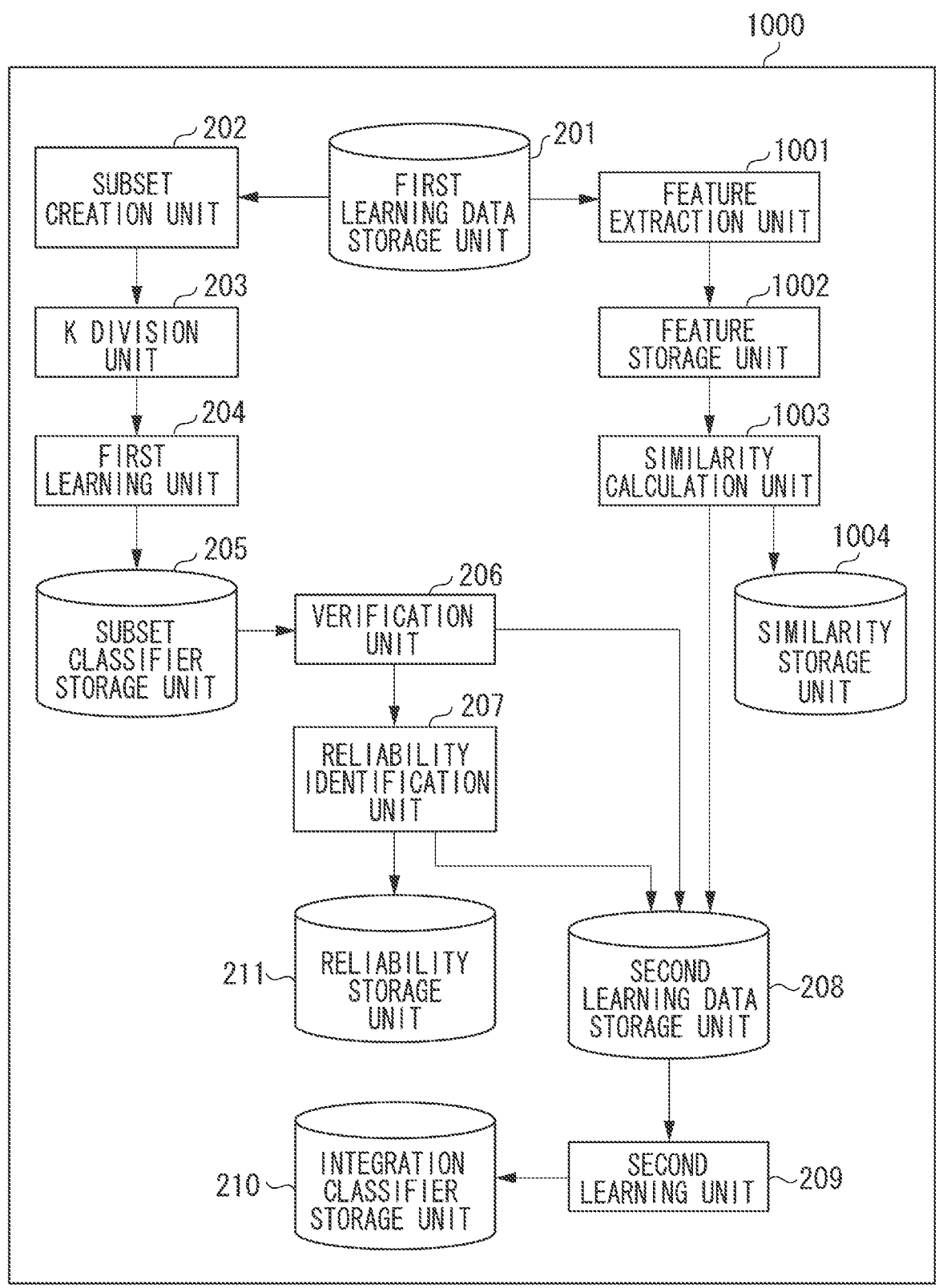
FIG. 10 is a block diagram illustrating a functional configuration of a learning apparatus according to the second embodiment.

A learning apparatus and an image identification apparatus according to a second embodiment perform learning of classifiers and image identification, using feature amounts of images. FIG. 10 is a block diagram illustrating a functional configuration of a learning apparatus 1000 according to the second embodiment. The learning apparatus 1000 includes a feature extraction unit 1001, a feature storage unit 1002, a similarity calculation unit 1003, and a similarity storage unit 1004, in addition to the functional configuration of the learning apparatus 100 according to the first embodiment. The feature extraction unit 1001 extracts a global feature as a feature amount of an image included in a learning data set, and stores the extracted global feature into the feature storage unit 1002. The feature extraction unit 1001 calculates a similarity between a global feature of a verification image of cross verification and the global feature of the image used for learning region classifiers, and stores the similarity into the similarity storage unit 1004.

Here, the global feature is a feature amount extracted from the entire image. An example of the global feature includes a bag of words (BoW) feature. About the BoW feature, the literature below can be referred to.

G. Csurka, C. Dance, L. Fan, J. Willamowski, C. Bray, "Visual categorization with bags of keypoints", ECCV SLCV Workshop, 2004

Further, an example of the global feature includes Spatial Pyramid Matching Kernel. About Spatial Pyramid Matching Kernel, the literature below can be referred to.

S. Lazebnik, C. Schmid and J. Ponce, "Beyond Bags of Features: Spatial Pyramid Matching for Recognizing Natural Scene Categories", CVPR2006

Further, as the global feature, a GIST feature can be referred to. About the GIST feature, the literature below can be referred to.

A. Oliva and A. Torralba, "Modeling the shape of the scene: a holistic representation of the spatial envelope", International Journal of Computer Vision, 2001

As other examples, the global feature may be a feature amount obtained by making RGB values in the image into a histogram or a feature amount obtained by dividing the image into blocks and making RGB values of the blocks into a histogram.

Figure 11:
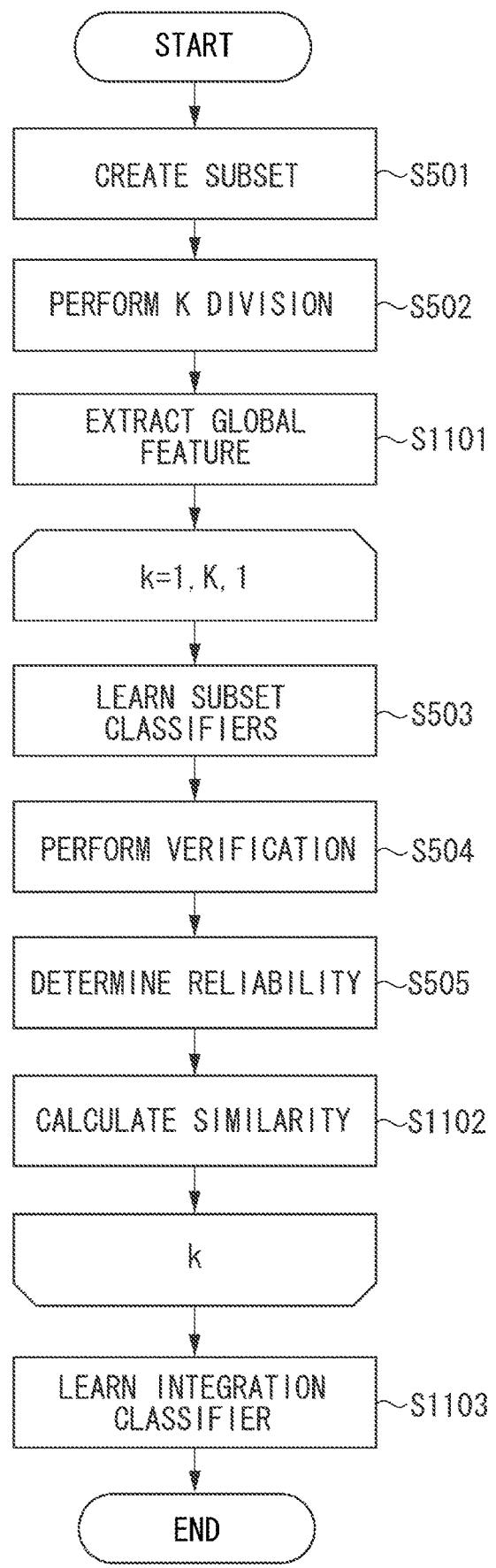
FIG. 11 is a flowchart illustrating learning processing according to the second embodiment.

FIG. 11 is a flowchart illustrating learning processing by the learning apparatus 1000 according to the second embodiment. The same processes as those in the first embodiment described with reference to FIG. 5, among processes illustrated in FIG. 11, are denoted with the same numbers and description thereof is omitted. A CPU 101 advances the processing to step S1101 after the processing of step S502. In step S1101, the feature extraction unit 1001 extracts the global features from all learning images and a verification image, and stores the global features to the feature storage unit 1002. The processing for extracting the global feature may only have to be performed before the processing of step S505, and its processing timing is not limited to the timing of the embodiment. The CPU 101 advances the processing to step S503 after the processing in step S1101.

Further, the CPU 101 advances the processing to step S1102 after the processing in step S505. In step S1102, the similarity calculation unit 1003 calculates similarities between the global feature of the verification image in each step of K division cross verification and the global features of all the learning images, based on the global features stored in the feature storage unit 1002. The similarity calculation unit 1003 calculates a cumulative similarity for the verification image, for each subset, from a k nearest image. The similarity calculation unit 1003 further applies the K division cross verification method again to the images divided into the learning images by the K division cross verification method, to obtain cumulative similarities of all the learning images, for each subset.

Then, the similarity calculation unit 1003 calculates weight values to be multiplied to the subset classifiers, by dividing the cumulative similarity regarding the verification image by an average of the cumulative similarities of all the learning images included in the subset. The weight values are used for learning an integration classifier, and thus the similarity calculation unit 1003 stores the weight values into the second learning data storage unit 208. The similarity calculation unit 1003 further stores the cumulative similarity of the verification image into the similarity storage unit 1004. When all the steps in the K division cross verification method are performed, the cumulative similarity of each subset is obtained regarding all the images included in the learning data set of the first learning data storage unit 201.

After the processing in steps S503 to S505 and step S1102 is performed K times, the CPU 101 advances the processing to step S1103. In step S1103, the second learning unit 209 uses values obtained by multiplying classification results of subset classifiers by the weight values obtained in step S1102, and reliabilities of the subset classifiers, as feature amounts of the integration classifier. The processing other than that is similar to that performed in step S506 of FIG. 5.

As another example, the second learning unit 209 may learn the integration classifier by employing the cumulative similarity as the feature amount of the integration classifier, as a new feature dimension, in place of multiplication of the weight.

As described above, the learning apparatus 1000 can learn the classifiers in consideration of the similarities of the images in the subset.

Figure 12:
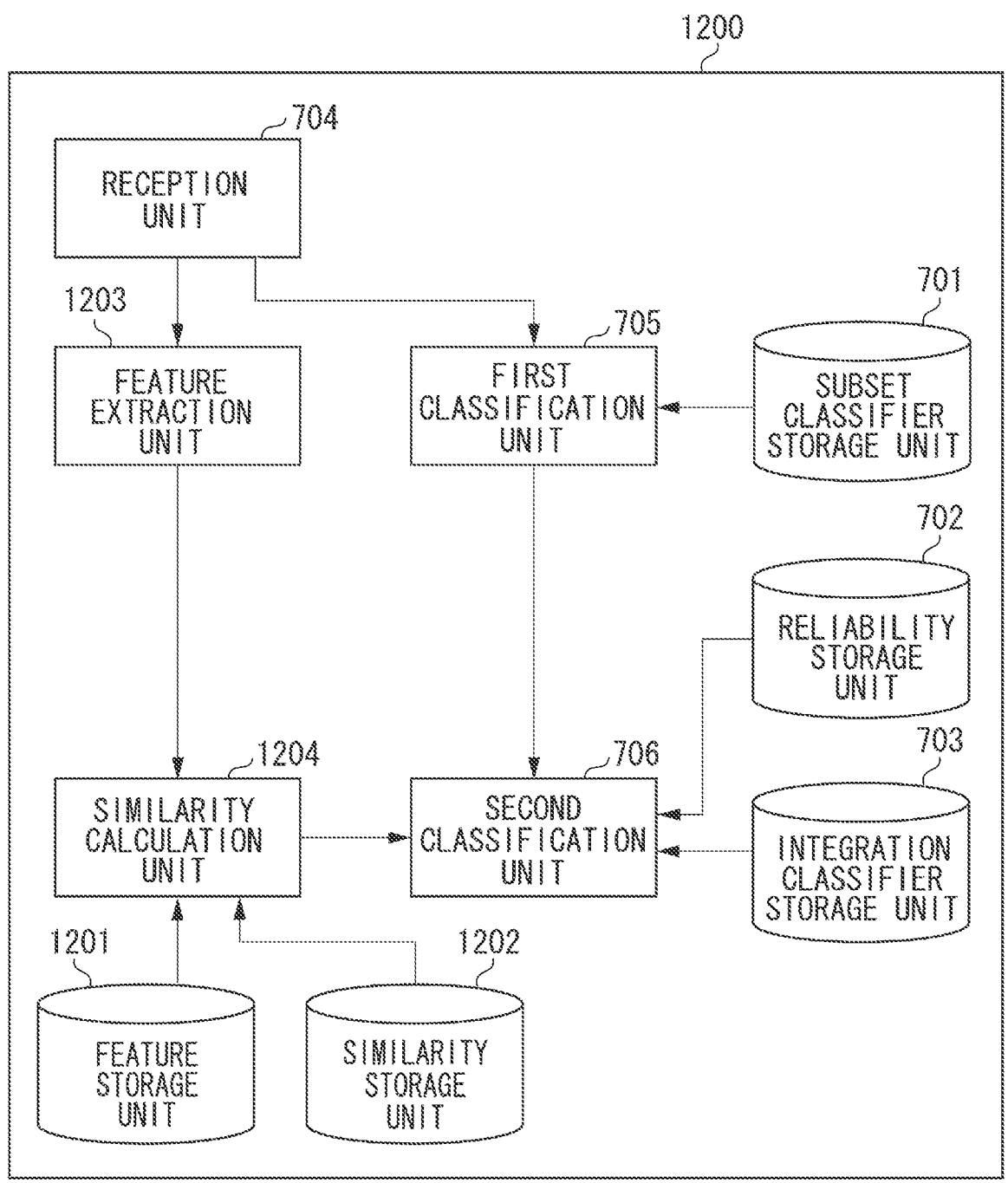
FIG. 12 is a block diagram illustrating a functional configuration of an image identification apparatus according to the second embodiment.

Next, an image identification apparatus according to the second embodiment will be described. FIG. 12 is a block diagram illustrating a functional configuration of an image identification apparatus 1200 according to the second embodiment. The image identification apparatus 1200 includes a feature storage unit 1201, a similarity storage unit 1202, a feature extraction unit 1203, and a similarity calculation unit 1204, in addition to the functional configuration of the image identification apparatus 700 according to the first embodiment.

The global features of the images included in the learning data set, which have been obtained by the learning apparatus 1000, are stored in the feature storage unit 1201 in advance. An average value of the cumulative similarities of each subset (average cumulative similarity), which has been obtained by the learning apparatus 1000, is stored in the similarity storage unit 1202 in advance. The feature extraction unit 1203 extracts a global feature from the target image. The similarity calculation unit 1204 calculates similarities between the target image, and the images of the subsets.

Figure 13:
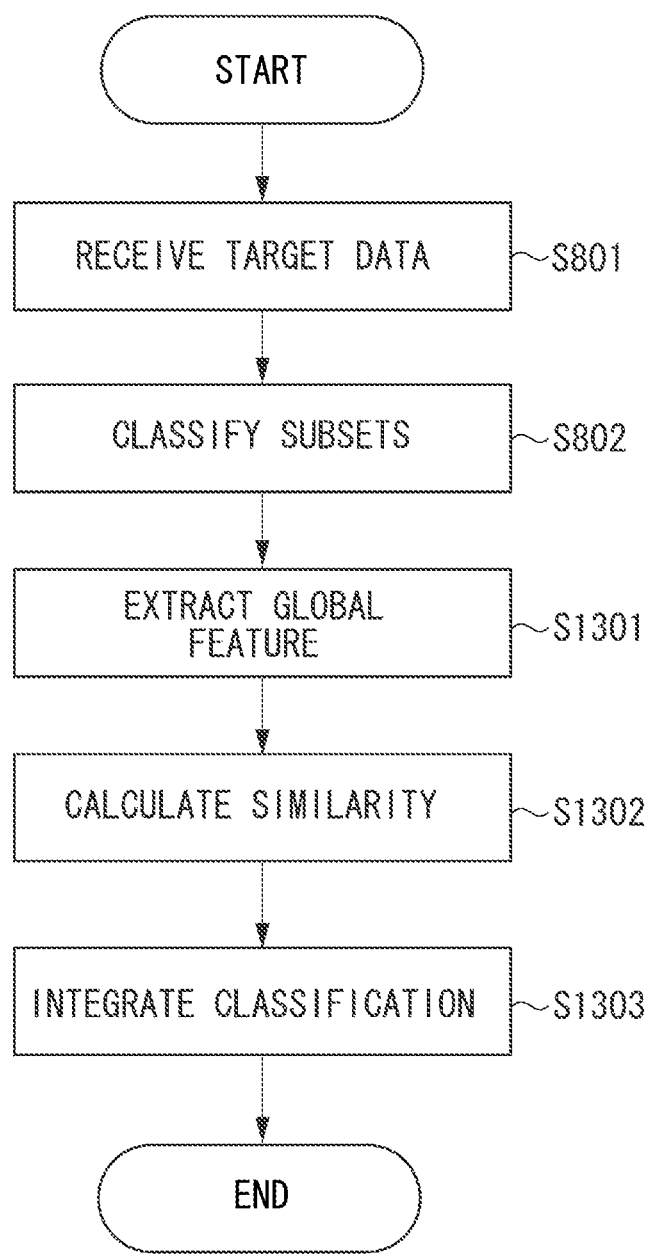
FIG. 13 is a flowchart illustrating image identification processing according to the second embodiment.

FIG. 13 is a flowchart illustrating image identification processing by the image identification apparatus 1200 according to the second embodiment. The same processes as the processes according to the first embodiment described with reference to FIG. 8, among processes illustrated in FIG. 13, are denoted with the same numbers and description thereof is omitted. The CPU 101 advances the processing to step S1301 after the processing in step S802. In step S1301, the feature extraction unit 1203 extracts the global feature from the target image. Next, in step S1302, the similarity calculation unit 1204 calculates similarities between the global feature of the target image, and the global features of the learning images of the subsets stored in the feature storage unit 1201. Further, the similarity calculation unit 1204 calculates the weight values of the subset classifiers, for the target image, based on the calculated similarities.

Here, first, a method for calculating the similarity will be described. When the global feature is a vector having the number of dimensions D, and the global features of arbitrary two images are expressed by $x_1$ and $x_2$, respectively, the similarity between the two images is expressed by $K(x_1, x_2)$, using a kernel function K. The similarity calculation unit 1204 calculates the similarity with an inner product expressed by the formula (4). In the formula (4), $<x, y>$ represents an inner product of vectors x and y. As another example, the similarity calculation unit 1204 may calculate the similarity, using Gaussian kernel expressed by the formula (5):

$$K(x_1, x_2) = \langle x_1, x_2 \rangle \quad (4)$$

$$K(x_1, x_2) = \exp\left(-\frac{1}{2\sigma^2}\langle(x_1, x_2), (x_1, x_2)\rangle\right) \quad (5)$$

Next, a method for calculating the weight values will be described. The similarity calculation unit 1204 acquires the images of the learning data set, and the k nearest image, for each subset, after calculating the similarity of the target image. For example, subset classifiers $C_1$, $C_2$, and $C_3$ corresponding to subsets $S_1$, $S_2$, and $S_3$ illustrated in FIG. 6 are set, and k=5 is set. Further, as illustrated in FIG. 14, a plurality of subsets including the same image exists. The similarity calculation unit 1204 adds the similarities of the images included in the subsets with respect to the target image 1400 to calculate the cumulative similarities. For example, in the example illustrated in FIG. 14, the cumulative similarities of the subsets $S_1$ to $S_3$ are 3.34, 3.02, and 2.8, respectively, by the formulae (6) to (8):

$$0.8+0.7+0.65+0.6+0.59=3.34 \quad (6)$$

$$0.7+0.65+0.6+0.55+0.52=3.02 \quad (7)$$

$$0.7+0.6+0.52+0.5+0.48=2.8 \quad (8)$$

Next, the similarity calculation unit 1204 calculates the weight values by dividing the cumulative similarities of the subsets with respect to the target image obtained by the above-described processing by the average cumulative similarities of the subsets stored in the similarity storage unit 1202. For example, the average cumulative similarities of the subset $S_1$, $S_2$, and $S_3$ are 3.2, 3.1, and 2.5. In this case, a weight value $w_1$ of the subset classifier $C_1$ is 1.04 by the formula (9). Similarly, weight values $w_2$ and $w_3$ of the subset classifiers $C_1$ and $C_3$ are 0.97 and 1.12, respectively, by the formulae (10) and (11):

$$w_1=3.34/3.2=1.04 \quad (9)$$

$$w_2=3.02/3.1=0.97 \quad (10)$$

$$w_3=2.8/2.5=1.12 \quad (11)$$

Referring back to FIG. 13, after the processing in step S1302, in step S1303, the second classification unit 706 integrates the classifiers of the subset classifiers to obtain the conclusive classification result. At that time, the second classification unit 706 refers to the reliabilities stored in the reliability storage unit 702, the integration classifier stored in the integration classifier storage unit 703, and the weight values calculated in step S1302. For example, the likelihoods of the subset classifiers $C_1$, $C_2$, and $C_3$ are $L_1$, $L_2$, $L_3$, the reliabilities are $A_1$, $A_2$, and $A_3$, and the weight values are $w_1$, $w_2$, and $w_3$. In this case, a feature amount f input to the integration classifier is expressed by the formula (12):

$$f=\{W_1L_1,A_1,W_2L_2,A_2,W_3L_3,A_3\} \quad (12)$$

As another example, the second classification unit 706 may use the cumulative similarities calculated in step S1302 as the feature amounts input to the integration classifier, in place of multiplication of the weight values. In this case, the feature amount f is expressed by the formula (13):

$$f=\{v_1,L_1,A_1,v_2,L_2,A_2,v_3,L_3,A_3\} \quad (13)$$

As described above, when an image similar to the target image serving as the classification target is included in the learning data set, the image identification apparatus 1200 can obtain the conclusive classification result, giving priority to the classification results by the subset classifiers learned by the similar image.

Other configurations and processing of the learning device and the image identification apparatus according to the second embodiment are similar to those of the learning apparatus and the image identification apparatus according to the first embodiment.

Figure 15:
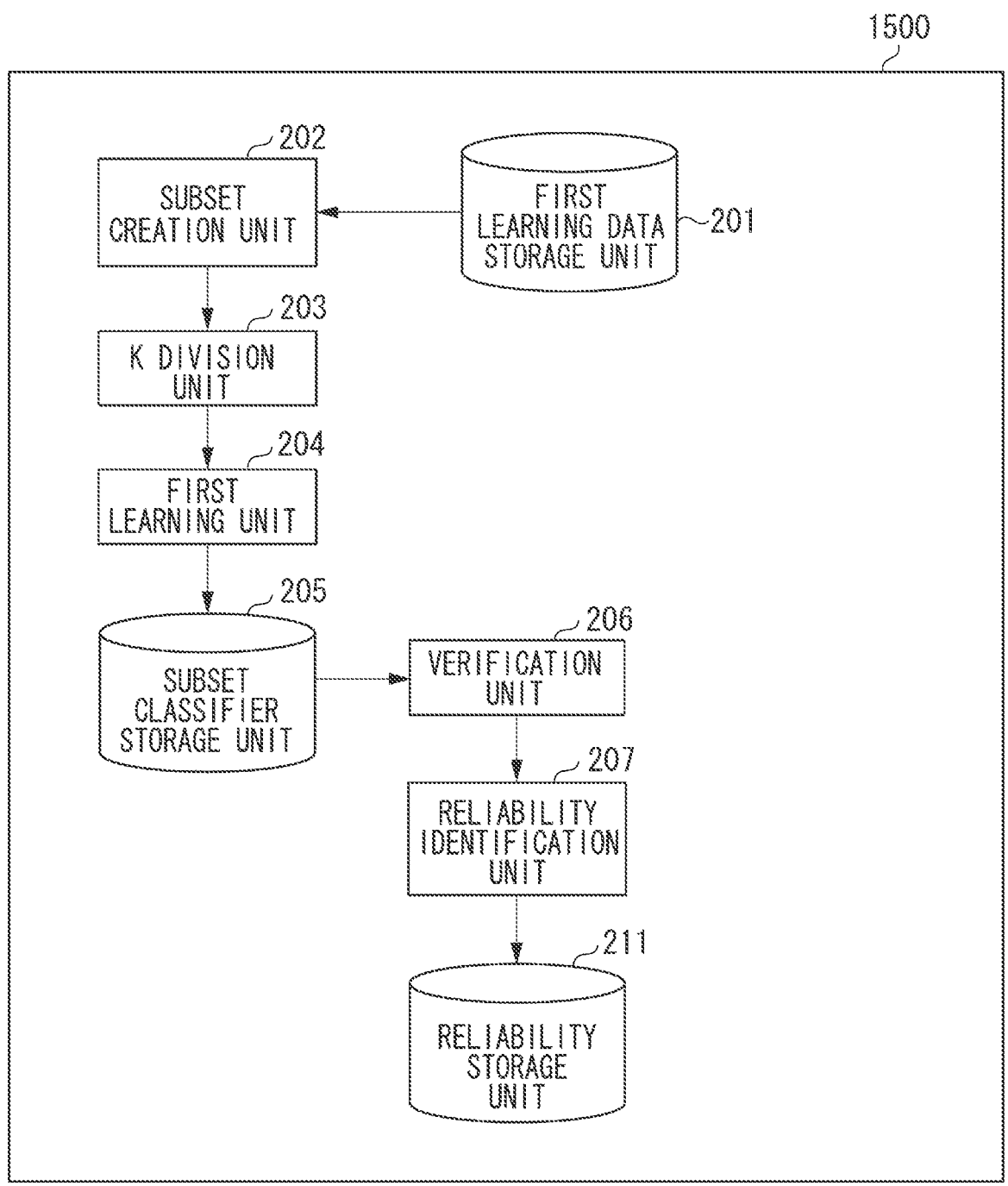
FIG. 15 is a block diagram illustrating a functional configuration of a learning apparatus according to a third embodiment.

A learning apparatus and an image identification apparatus according to a third embodiment perform learning of classifiers for detecting a region of a specific one category and image identification. FIG. 15 is a block diagram illustrating a functional configuration of a learning apparatus 1500 according to the third embodiment. The learning apparatus 1500 does not include the second learning data storage unit 208, the second learning unit 209, and the integration classifier storage unit 210 of the learning apparatus 100 according to the first embodiment. Further, processing of a first learning unit 204, a verification unit 206, and a reliability identification unit 207 differs therefrom. Processing of the units will be described below with reference to FIG. 16.

Figure 16:
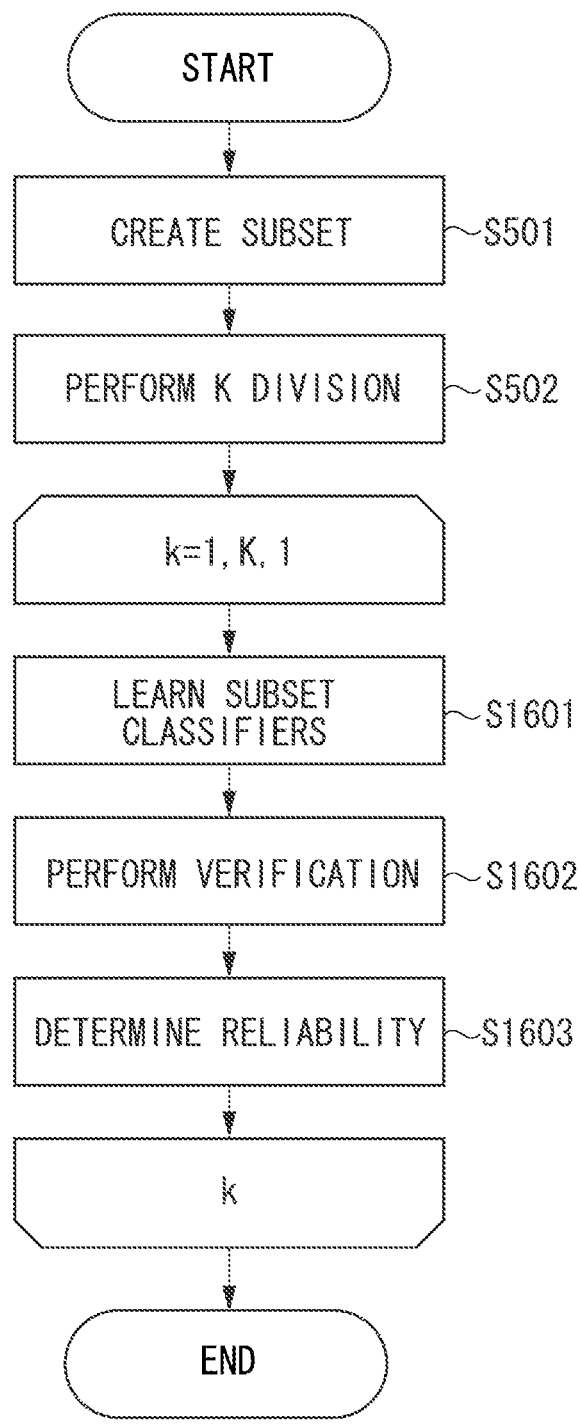
FIG. 16 is a flowchart illustrating learning processing according to the third embodiment.

FIG. 16 is a flowchart illustrating learning processing by the learning apparatus 1500 according to the third embodiment. A CPU 101 advances the processing to step S1601 after the processing in step S502. In step S1601, the first learning unit 204 extracts a feature amount of a small region. This processing is similar to the processing for extracting the feature amount of the small region in step S503. The first learning unit 204 provides "+1" to the specific category to be detected later, and "−1" and a teacher label to other regions, and performs learning of subset classifiers. Then, the first learning unit 204 stores the obtained subset classifiers into the subset classifier storage unit 205.

Next, in step S1602, the verification unit 206 obtains an error rate for verification data. Here, the error rate is a generalization error with respect to classification results of two classes "+1" and "−1". Next, in step S1603, the reliability identification unit 207 determines reliabilities of the subset classifiers based on the error rate, and stores the reliabilities into the reliability storage unit 211. The reliability identification unit 207 obtains a reliability R from an error rate e by the formula (14):

$$R = \frac{1}{2}\ln\left(\frac{1-e}{e}\right) \quad (14)$$

As another example, an experience error may be used as the error rate, in place of the generalization error. Further, as described above, the reliability may be obtained from the number of learning data, the number of feature dimensions, or the number of support vectors in a case of a support vector machine.

Figure 17:
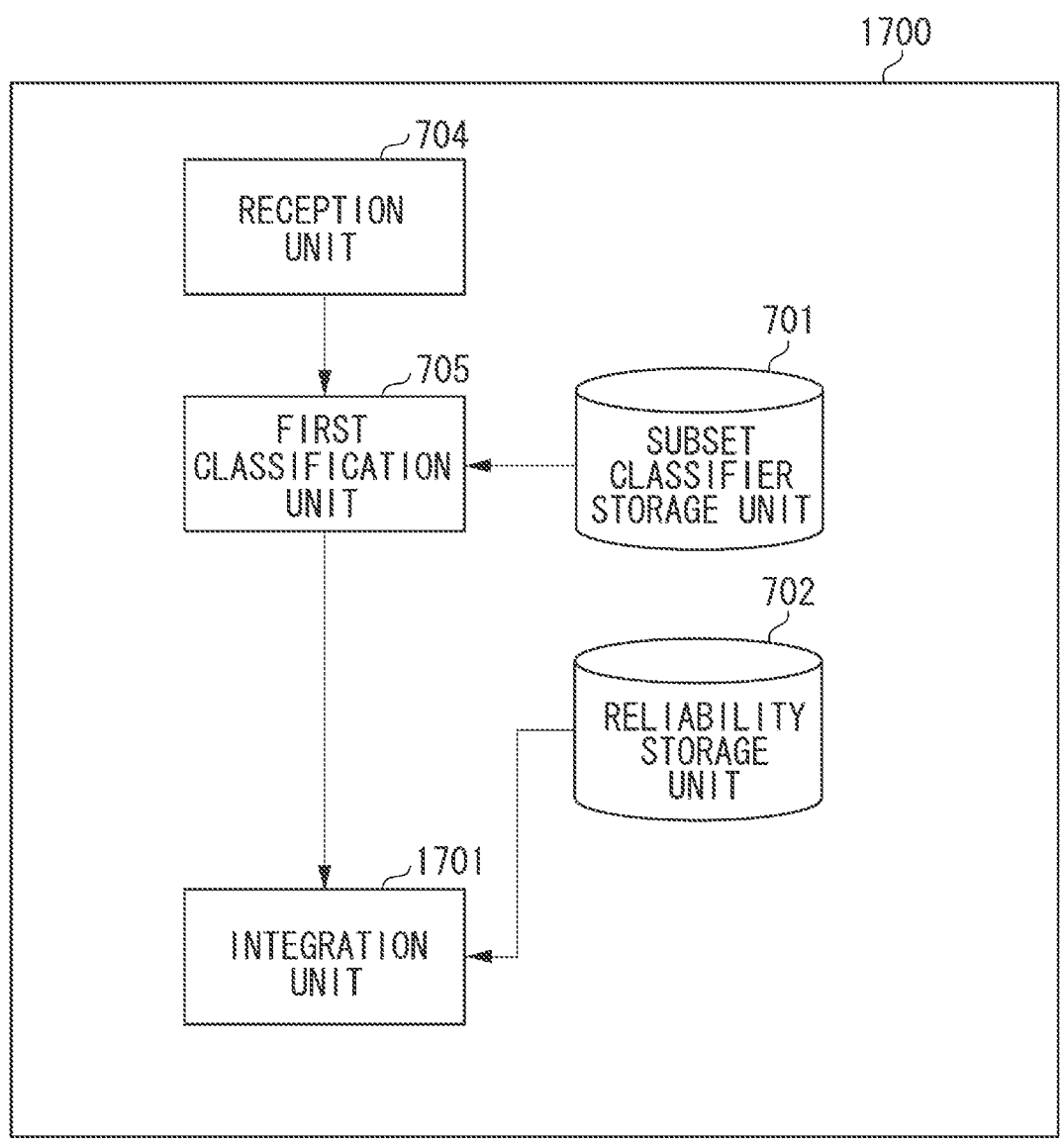
FIG. 17 is a block diagram illustrating a functional configuration of an image identification apparatus according to the third embodiment.

FIG. 17 is a block diagram illustrating a functional configuration of an image identification apparatus 1700 according to the third embodiment. The image identification apparatus 1700 does not include the integration classifier storage unit 703 and the second classification unit 706 of the image identification apparatus 700 according to the first embodiment, and includes an integration unit 1701. Further, processing of a first classification unit 705 differs therefrom. Processing of the first classification unit 705 and the integration unit 1701 will be described below with reference to FIG. 18.

Figure 18:
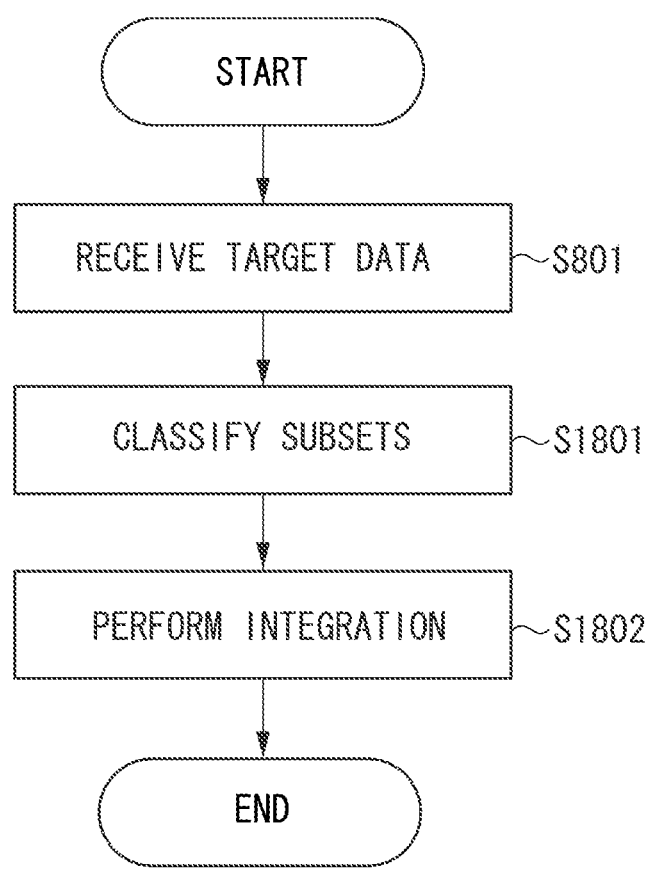
FIG. 18 is a flowchart illustrating image identification processing according to the third embodiment.

FIG. 18 is a flowchart illustrating image identification processing by the image identification apparatus 1700 according to the third embodiment. A CPU 101 advances the processing to step S1801 after the processing in step S801. In step S1801, the first classification unit 705 divides a target image into small regions. Then, the first classification unit 705 classifies categories of the small regions according to the two values "+1" and "−1" that indicate a specific category and the others. Next, in step S1802, the integration unit 1701 multiplies the classification results obtained by the subset classifiers by the reliabilities stored in the reliability storage unit 702, and then obtains a total of the reliabilities as a conclusive determination result.

For example, the classification results obtained in step S1801 for three subset classifiers $C_1$, $C_2$, and $C_3$ are $L_1$, $L_2$, and $L_3$, respectively. Here, $$L_n \in \{-1,1\}, n=1,2,3.$$

Further, the reliabilities of the subset classifiers are $A_1$, $A_2$, and $A_3$, respectively. In this case, a conclusive integration result (classification result) I is obtained by the formula (15). In the formula (15), sgn represents a signum function, and the category of a corresponding small region is the specific category when I is +1, and the category is other than the specific category when I is −1.

$$I=\text{sgn}(A_1L_1+A_2L_2+A_3L_3) \tag{15}$$

Other configurations and processing of the learning device and the image identification apparatus according to the third embodiment are similar to the configurations and processing of the learning apparatus and the image identification apparatus according to the other embodiments.

As described in the first and second embodiments, in a case of using an integration classifier, learning of the integration classifier in the latter stage needs to be performed using a k-division cross verification method. In this case, the number of data used for learning the integration classifier depends on the number of images having the same sensor information as a camera used at classification. Therefore, when the number of data for learning the integration classifier is too small, as compared with dimensions of input feature amounts, appropriate learning may not be performed. In contrast, in the third embodiment, the integration classifier is not used. Therefore, appropriate learning of classifiers and image identification can be performed even when the number of learning data is small.

As another example, the learning apparatus and the image identification apparatus of the third embodiment may perform equivalent processing by use of the integration classifier.

Embodiments have been described in detail. However, the present invention is not limited to the specific embodiments, and various modifications and changes can be made within the scope of the gist of the present invention described in claims.

According to the embodiments, images can be classified with accuracy based on the sensor information and the images.

OTHER EMBODIMENTS

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-187442, filed Sep. 26, 2016, which is hereby incorporated by reference herein in its entirety.

What is claimed is:

1. A learning apparatus comprising:
   one or more processors; and
   a memory coupled to the one or more processors and storing instructions which, when executed by the one or more processors, cause the learning apparatus to perform operations including:
   acquiring a plurality of learning data sets, wherein each learning data set includes one image of a plurality of images, wherein the one image is imaged by one imaging device of a plurality of imaging devices, and acquiring sensor information representing an imaging environment of the one imaging device, wherein the sensor information is sensed by at least one of a plurality of predetermined types of sensors corresponding to the one imaging device when the one image is imaged,
   creating, from the plurality of learning data sets, a plurality of subsets, wherein each subset of the plurality of subsets corresponds to sensor information representing imaging environments sensed by a different one type of, or a different combination of, a plurality of types of sensors, and
   learning each of a plurality of first classifiers based on respective one subset of the plurality of subsets corresponding to that one of the plurality of first classifiers.

2. The learning apparatus according to claim 1,
   wherein executing the instructions further causes the learning apparatus to perform operations including dividing the plurality of subsets into learning data and verification data, and
   wherein learning includes using the learning data included in the plurality of subsets to learn the plurality of first classifiers.

3. The learning apparatus according to claim 1, wherein learning is a first learning and executing the instructions further causes the learning apparatus to perform operations including learning, as a second learning, a second classifier configured to integrate classification results of learning the plurality of first classifiers.

4. The learning apparatus according to claim 3,
wherein executing the instructions further causes the learning apparatus to perform operations including dividing the plurality of subsets into learning data and verification data, and determining, in a case where the plurality of first classifiers is used to obtain determination results of the verification data reliabilities of the plurality of first classifiers from the determination results, and
wherein the second learning further learns the second classifier based on the determined reliabilities of the plurality of first classifiers.

5. The learning apparatus according to claim 4,
wherein executing the instructions further causes the learning apparatus to perform operations including extracting feature amounts of images included in the plurality of subsets, and determining weight values for the plurality of first classifiers based on the extracted feature amounts, and
wherein the second learning further learns the second classifier based on the weight values for the plurality of first classifiers.

6. The learning apparatus according to claim 1, wherein creating includes creating a first subset including only an image, and a second subset including an image and sensor information representing imaging environments sensed by at least one type of the sensor of the plurality of types of sensors.

7. The learning apparatus according to claim 1,
wherein the acquired sensor information includes first sensor information corresponding to a first sensor and second sensor information corresponding to a second sensor having a type that is different from a type of the first sensor, and
wherein creating includes creating at least two subsets, from among a first subset including an image and the first sensor information, a second subset including an image and the second sensor information, and a third subset including an image and the first sensor information and the second sensor information.

8. The learning apparatus according to claim 1, wherein the sensor information is information and an image obtained together by an imaging apparatus.

9. The learning apparatus according to claim 1, wherein the sensor information is information obtained by a sensor of the one imaging device at a timing corresponding to a timing at which the one imaging device images an image.

10. A non-transitory computer-readable storage medium storing a program to cause a computer to execute a method for a learning apparatus, the method comprising:
acquiring a plurality of learning data sets, wherein each learning data set includes one image of a plurality of images, wherein the one image is imaged by one imaging device of a plurality of imaging devices, and acquiring sensor information representing an imaging environment of the one imaging device, wherein the sensor information is sensed by at least one of a plurality of predtermined types of sensors corresponding to the one imaging device when the one image is imaged;
creating, from the plurality of learning data sets, a plurality of subsets, wherein each subset of the plurality of subsets corresponds to sensor information representing imaging environments sensed by a different one type of, or a different combination of, a plurality of types of sensors; and
learning each of a plurality of first classifiers based on respective one subset of the plurality of subsets corresponding to that one of the plurality of first classifiers.

* * * * *